United States Patent
Streuer

(10) Patent No.: US 9,048,476 B2
(45) Date of Patent: Jun. 2, 2015

(54) COVER PART FOR A RECHARGEABLE BATTERY AND RECHARGEABLE BATTERY HAVING A COVER PART SUCH AS THIS

(75) Inventor: Peter Streuer, Hannover (DE)

(73) Assignee: Johnson Controls Autobatterie GmbH & Co. KGaA, Hannover (DE)

( * ) Notice: Subject to any disclaimer, the term of this patent is extended or adjusted under 35 U.S.C. 154(b) by 174 days.

(21) Appl. No.: 13/560,651

(22) Filed: Jul. 27, 2012

(65) Prior Publication Data

US 2014/0030585 A1 Jan. 30, 2014

(51) Int. Cl.
*H01M 2/02* (2006.01)
*H01M 2/06* (2006.01)
*H01M 2/04* (2006.01)

(52) U.S. Cl.
CPC .............. *H01M 2/06* (2013.01); *H01M 2/0482* (2013.01)

(58) Field of Classification Search
CPC ........ H01M 2/30; H01M 2/06; H01M 2/0482

USPC .................................................... 429/175, 179
See application file for complete search history.

(56) References Cited

U.S. PATENT DOCUMENTS

2005/0175893 A1*  8/2005  Kawada et al. ............... 429/178
2010/0291435 A1* 11/2010  Garin et al. .................... 429/180

FOREIGN PATENT DOCUMENTS

DE    10 2010 033 645 A1   8/2010
EP         2 416 408        8/2011

* cited by examiner

*Primary Examiner* — Gary Harris
(74) *Attorney, Agent, or Firm* — Boardman & Clark LLP

(57) ABSTRACT

The invention relates to a cover part (1) for a rechargeable battery, with the cover part (1) being produced from plastic and having at least one sleeve-like connecting socket (2) for making electrical contact with the rechargeable battery, with a lower section (26) of the connecting socket (2) being embedded in the plastic material of the cover part (1), wherein a plurality of sliding elements (3), which are in the form of strips and are separated from one another over the internal circumference of the connecting socket (2), are arranged on the inside of the connecting socket (2).

11 Claims, 3 Drawing Sheets

COVER PART FOR A RECHARGEABLE BATTERY AND RECHARGEABLE BATTERY HAVING A COVER PART SUCH AS THIS

FIELD

The invention relates to a cover part for a rechargeable battery. The invention furthermore relates to a rechargeable battery having a housing part, at least one plate set which is inserted into the housing part, a pole shaft which is connected to the plate set, and a rechargeable-battery cover.

BACKGROUND

Rechargeable batteries for vehicles, in particular in the form of so-called starter batteries, generally have two connecting poles, to which the pole terminals of the vehicle are connected. One known connecting pole which is used for this purpose has a sleeve-like connecting socket and a pole shaft which is passed through the connecting socket. The pole shaft is connected to electrode plates of a plate set in the interior of the rechargeable battery. In a rechargeable battery which has been produced completely, the connecting socket is connected electrically conductively and in a liquid-tight and gas-tight manner to the pole shaft, in general by welding.

During the production of a rechargeable battery, the plate sets with the pole shafts connected to them are first of all inserted into a housing part. A cover part which has been provided with connecting sockets is then fitted to the housing part. During this process, increased friction and constrictions can occur while the connecting sockets are being fitted to the pole shafts, in particular if the pole shafts are positioned slightly obliquely and are not aligned precisely with the connecting sockets. This makes it harder to manufacture the rechargeable battery.

It is known from EP 1 453 124 B1 for a sliding element, which completely surrounds the pole shaft in the circumferential direction, to be provided in order to reduce the friction between the connecting socket and the pole shaft. This design has been proven in principle.

SUMMARY

In contrast, the invention is based on the object of specifying a cover part for a rechargeable battery, which makes it possible to further improve the manufacture of the rechargeable battery, in particular with respect to fitting the cover part to the housing part.

This object is achieved by the invention as specified in claims 1 and 12. The dependent claims indicate advantageous developments of the invention.

According to the invention, instead of a single sliding element which extends over the entire circumference of the pole shaft, a plurality of sliding elements are proposed, which are in the form of strips and are separated from one another over the internal circumference of the connecting socket. This makes it possible to reduce the contact area between the sliding elements and the pole shaft, and therefore to further reduce the disturbing friction. Furthermore, the sliding elements which are in the form of strips and are at a distance from one another can be manufactured more easily and at a lower cost. In addition, the separations which are provided between the sliding elements create free spaces which allow flexible matching of the individual sliding elements during insertion of the pole shaft. This also makes it possible to improve the manufacturing process for production of a rechargeable battery. Designing the sliding elements to be in the form of strips has the further advantage that this allows alignment of any pole shafts which may be positioned obliquely to be further improved. In consequence, the sliding elements advantageously extend in the insertion direction of the pole shaft.

The pole shaft and the connecting socket are normally manufactured from lead. The sliding elements make it possible to considerably reduce the relatively high friction which occurs when contact is made between two parts produced from lead.

Overall, the invention makes it possible to largely minimize the disturbing friction when fitting the cover part to the housing part in the area of the pole shafts and to avoid constrictions. In consequence, this makes it possible to avoid the possibility of pole shafts being pushed down, in an undesirable manner, during fitting of the cover part.

The sliding elements are advantageously arranged close to one another over the internal circumference of the connecting pole and are of such a thickness that the upper end of the pole shaft cannot make contact with the inner wall of the connecting socket between two sliding elements. This means that the pole shaft is aligned such that it slides along the sliding elements and can enter the upper area of the connecting socket without any constriction. The connecting socket can then be welded to the pole shaft.

The advantageous developments of the invention explained in the following text can in principle be provided for all sliding elements or else only for a subset of the sliding elements, for example for one, a number or all of the sliding elements. For the sake of simplicity, reference is therefore made in principle to "sliding elements". This includes the possibility of said development being provided for only one of the sliding elements, for a number of the sliding elements or for all of the sliding elements.

According to one advantageous development of the invention, the sliding elements have the greatest dimension in the longitudinal direction of the connecting socket. In the case of a rotationally symmetrical connecting socket, the longitudinal direction of the connecting socket corresponds in particular to the axis of symmetry of the connecting socket. Said development has the advantage that a relatively long guide path is provided for insertion of the pole shaft into the connecting socket. This has the advantage that reliable, low-friction insertion of the pole shaft into the connecting socket is further improved.

According to one advantageous development of the invention, the sliding elements extend at least over the lower section of the connecting socket, which is embedded in the plastic material of the cover part, in the longitudinal direction of the connecting socket. This provides a long guide path for the pole shaft, ensuring that the pole shaft is inserted easily and reliably into the connecting socket.

According to one advantageous development of the invention, the sliding elements extend at least as far as one end of the connecting socket which is directed at the interior of the rechargeable battery, in the longitudinal direction of the connecting socket, that is to say as far as the end which faces away from that connecting section of the connecting socket which is intended for the connection of a pole terminal. This ensures that the pole shaft is guided and aligned reliably and with little friction even at the start of the process of fitting the battery cover to the housing part of the rechargeable battery.

According to one advantageous development of the invention, the sliding elements project from the inside of the connecting socket, thus forming a separation between the inside of the connecting socket and a pole shaft in the area of the sliding elements. In this case, the sliding elements advantageously act as spacers, thus preventing the possibility of direct contact between the pole shaft and the connecting socket, and therefore undesirable friction.

According to one advantageous development of the invention, the sliding elements run to a point in a direction which faces away from the interior of the rechargeable battery, that is to say in the direction towards the connecting section for the pole terminal. In this case, by way of example, the sliding elements may taper conically or in the form of a curve towards the end. This has the advantage of allowing a uniform transition to be made to an inner section of the connecting socket, in which the pole shaft is intended to be welded to the connecting socket. In particular, this makes it possible to avoid sharp-edged transitions from one inner section to the other of the connecting socket, which has the advantage that the pole shaft can be inserted completely into the connecting socket uniformly and without any risk of tilting or snagging.

According to one advantageous development of the invention, the sliding elements rest on the inner wall which is formed on the inside of the connecting socket, that is to say even when the pole shaft has not yet been inserted into the connecting socket. In principle, at least before the pole shaft has been completely inserted into the connecting socket, the sliding elements may also be separated somewhat from the inside of the connecting socket.

According to one advantageous development of the invention, the sliding elements are produced from plastic. By way of example, the sliding elements may be inserted as separate insert elements into grooves on the inside of the connecting socket. According to one advantageous development of the invention, the sliding elements are manufactured integrally with the cover part from the plastic material of the cover part. This makes it possible to further simplify the production of rechargeable batteries. In particular, the sliding elements need not be inserted individually, manually or by machine into the connecting socket. Instead of this, provision can be made for sliding elements in the injection mould itself that is used to produce the cover part together with the embedded connecting socket.

According to one advantageous development of the invention, the connecting socket has a greater inclination of the inner wall with respect to the longitudinal axis of the connecting socket in the area of the sliding elements than in a connecting section which projects out of the cover part and is designed for connection of a pole terminal to the connecting socket. This allows the connecting socket to have an internal funnel shape in the area of the sliding elements. A funnel shape such as this has the advantage that this makes the insertion of the pole shaft into the connecting socket even simpler and more reliable.

The inclination of the inner wall in the area of the sliding elements may be constant or may be variable in the longitudinal direction. For example, the funnel shape may have a linear profile (conical shape) in the longitudinal direction or may be in the form of an arc, in particular a single-shell hyperboloid. It is particularly advantageous for the inner circumference to increase in the form of a curve in the area of the sliding elements, with this increase being progressive in the direction facing away from the connecting section.

BRIEF DESCRIPTION OF DRAWINGS

The invention will be explained in more detail in the following text with reference to exemplary embodiments and using drawings, in which.

The same reference symbols are used for mutually corresponding elements in the figures.

DETAILED DESCRIPTION

Figure 1:
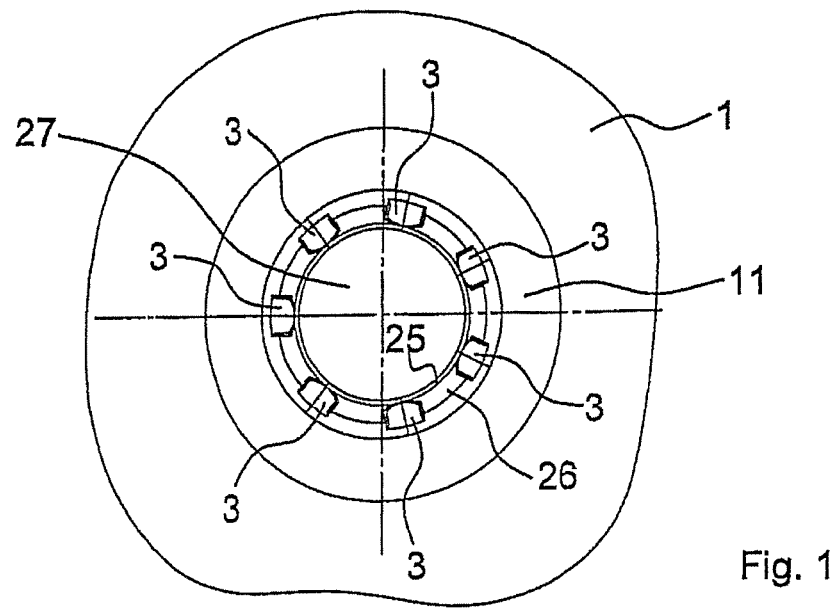
FIG. 1 shows a cover part with a connecting socket in a view from underneath.
Figure 2:
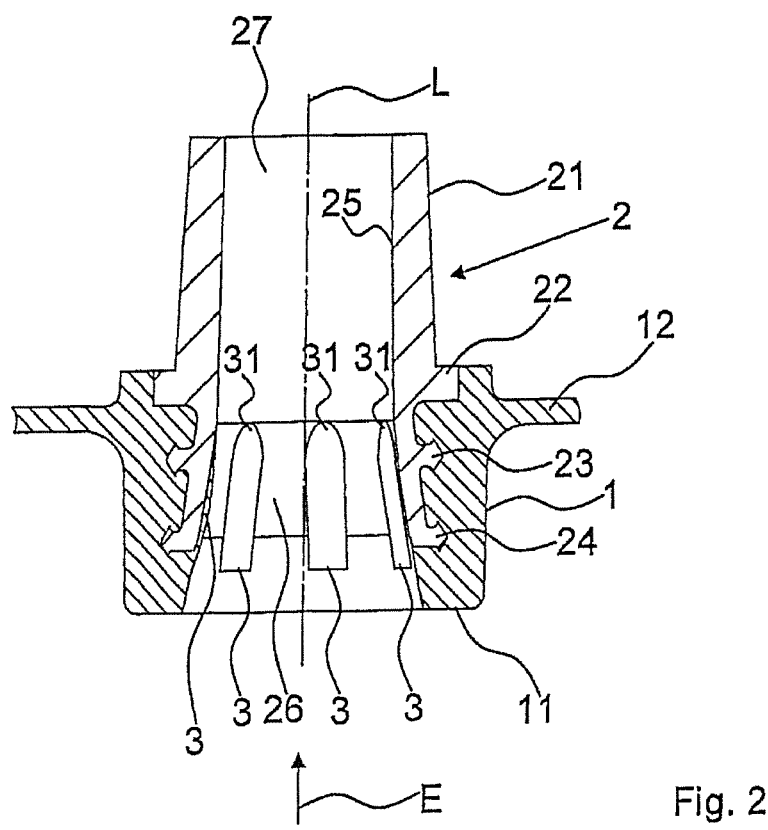
FIG. 2 shows the cover part with the connecting socket shown in FIG. 1 in a cross section from the side.

FIGS. 1 and 2 show various views of a detail of a cover part 1 with a connecting socket 2 embedded in the plastic material of the cover part 1. FIG. 2 shows a side section view, in which the interior of the rechargeable battery to be formed with the cover part is located under a wall 12 of the cover part. The insertion direction of a pole shaft into the connecting socket 2 is represented by an arrow E.

FIG. 1 shows the cover part 1 with the connecting socket 2 from FIG. 1 in a view from underneath, that is to say from the direction E.

The cover part 1 with the connecting socket 2 will be described in the following text with reference to FIGS. 1 and 2.

The connecting socket 2 has a connecting section 21 on the upper face of the cover part 1. The outside of the connecting section 21 is designed for connection of a pole terminal. Starting from the connecting section 21, the connecting socket 2 merges into an attachment section in which an annular circumferential enlargement 22 is first of all formed which, for example, may have a zigzag shape on the external circumference, in order to provide protection against the connecting socket 2 rotating with respect to the cover part 1. A labyrinth section is formed under the annular circumferential enlargement 22, in which annular projections 23, 24 with a hook-shaped profile are provided. The annular projections 23, 24 may alternatively also have a trapezoidal or round profile without hooks. The labyrinth section provides a reliable gas-tight and liquid-tight seal between the connecting socket 2 and the cover part 1.

The connecting socket 2 is in the form of a sleeve. An inner cavity 27 in the connecting socket 2 has an upper section 25 and a lower section 26. A plurality of sliding elements 3 which are in the form of strips and are distributed uniformly, at a distance from one another, over the internal circumference of the connecting socket 2, are arranged in the lower section 26.

The interior 27 of the connecting socket 2 may have inner wall sections which run cylindrically, conically or in a curved shape. By way of example, the upper section 25 can be virtually cylindrical, or may be conical with a small angle between it and the longitudinal axis L. The lower section 26 is advantageously conical or in the form of a curve, with a larger angle between it and the longitudinal axis L. In particular, the lower section 26 is in the form of a funnel with a larger opening than the upper section 25.

In the illustrated exemplary embodiment, seven sliding elements 3, each having the same width and being at the same distance apart from one another, are arranged over the internal circumference of the lower section 26 of the connecting socket 2. A different number of sliding elements is also advantageous. It is sensible to provide at least three sliding elements 3. The greater the number of sliding elements, the narrower they can be made. As can be seen in particular in FIG. 2, the sliding element 3 which is illustrated in the left-hand area rests on the inner wall of the section 26 of the connecting socket 2 and, because of its thickness of, for example, 0.4 mm, acts as a spacer for the pole shaft to be inserted.

Figure 3:
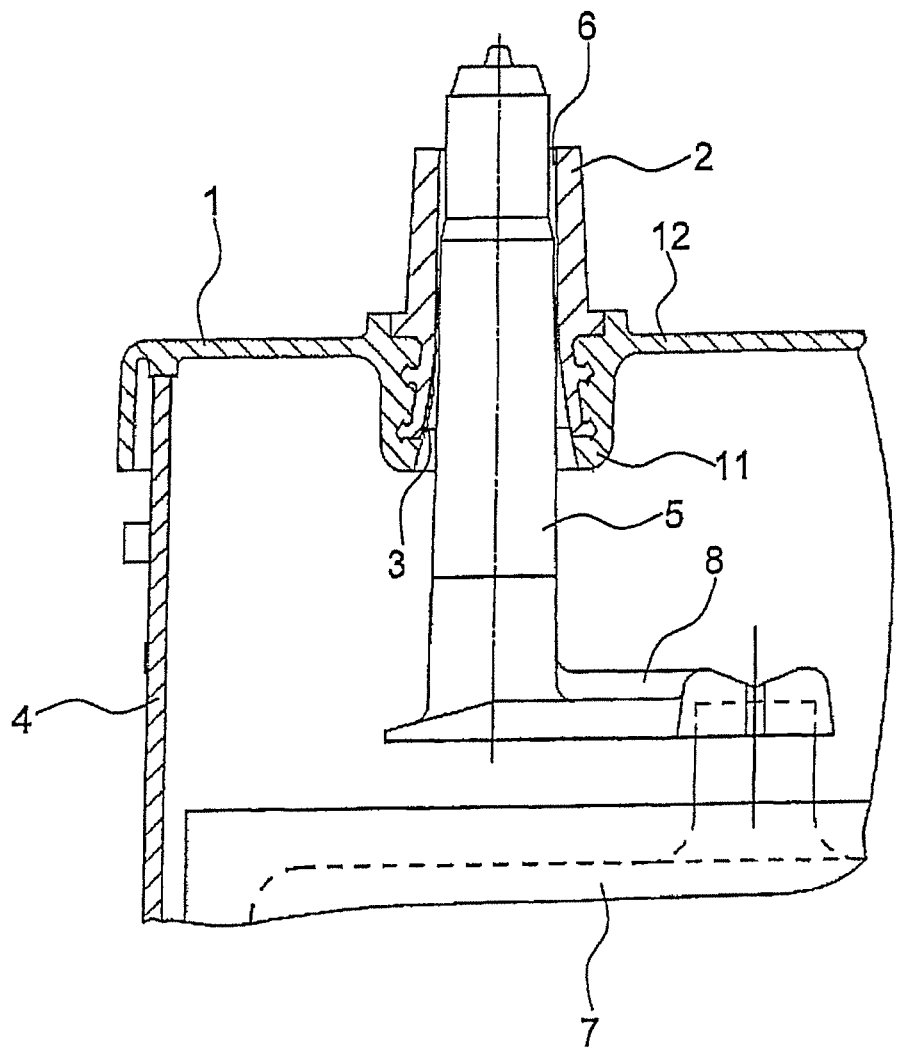
FIG. 3 shows a detail of a rechargeable battery.

FIG. 3 shows a detail of a rechargeable battery with a housing part 4 and a cover part 1 of the type described above, which has been fitted to the housing part 4. Electrode plates which form a plate set 7 are located in the interior of the housing part 4. The plate set 7 is electrically and mechanically connected via a connector 8 to a pole shaft 5. As can be seen, the pole shaft 5 has been inserted into the connecting socket 2 and projects somewhat from the connecting socket 2 on the outside of the rechargeable battery. The pole shaft 5 is designed to have a somewhat smaller diameter in this area than in the other areas. This results in an annular space 6 being formed between the pole shaft 5 and the connecting socket 2. This annular space 6 is used for electrical and mechanical connection of the pole shaft 5 to the connecting socket 2, for example by welding.

Figure 4:
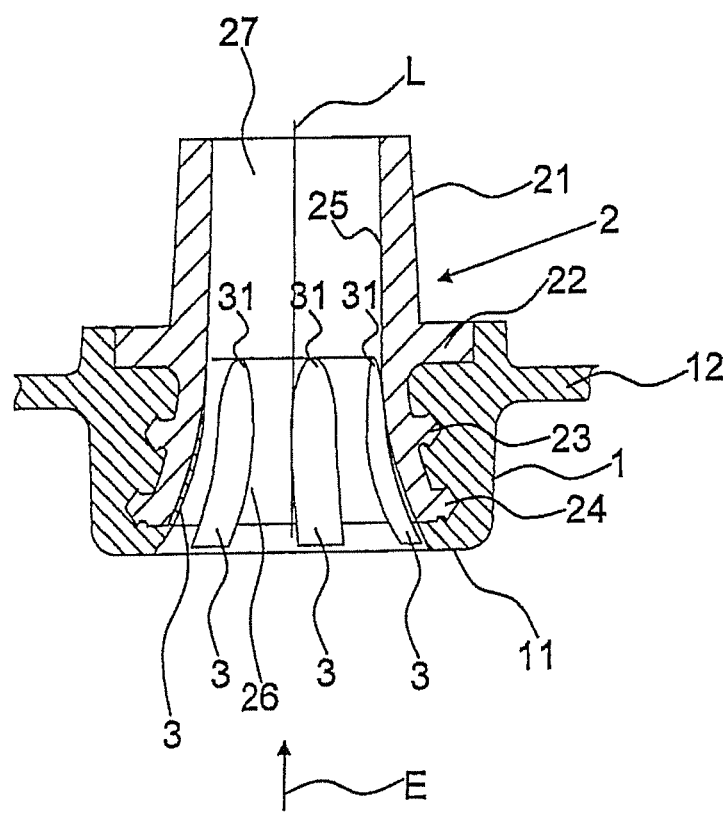
FIG. 4 shows a cover part with a further embodiment of a connecting socket in a cross section from the side.

The embodiments of the connecting socket 2 described above each have linear profiles in the longitudinal direction, that is to say corresponding conical sections. FIG. 4 shows an embodiment of a connecting socket 2 whose inner wall and outer wall have a curved profile in a lower section, which is embedded in the cover part 1 and is used as an attachment section. Connecting sockets as shown in FIG. 4 are used in particular for the commercial vehicle field. As can be seen, both the outer wall and the inner wall in the attachment section run parallel at least in those areas in which no circumferential projection 23, 24 is arranged, thus forming a constant wall thickness in these sections. The outer circumference and the inner circumference of the connecting socket 2 increase continuously downwards in the attachment section, that is to say in the direction of the insertion side of the pole socket 5. The contour of the inner wall and/or the outer wall in the longitudinal direction may have one of the already mentioned curved contours. As can be seen, in the embodiment of the connecting socket 2 shown in FIG. 4, the sliding elements 3 are curved in the longitudinal direction, and are therefore matched to the profile of the inner wall in the attachment section.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom") in this description are merely used to identify various elements as are oriented in the Figures. It should be recognized that the orientation of particular components may vary greatly depending on the application in which they are used.

For the purpose of this disclosure, the term "coupled" and like terms mean the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the system, methods, and devices as shown in the various examples of embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied (e.g. by variations in the number of engagement slots or size of the engagement slots or type of engagement). The order or sequence of any process or method steps may be varied or re-sequenced according to alternative embodiments. Other substitutions, modifications, changes and omissions may be made in the design, operating conditions and arrangement of the various examples of embodiments without departing from the spirit or scope of the present inventions.

While this invention has been described in conjunction with the examples of embodiments outlined above, various alternatives, modifications, variations, improvements and/or substantial equivalents, whether known or that are or may be presently foreseen, may become apparent to those having at least ordinary skill in the art. Accordingly, the examples of embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

The invention claimed is:

1. A cover part (1) for a rechargeable battery, with the cover part (1) being made of plastic material, the cover part comprising at least one sleeve-like connecting socket (2) for making electrical contact with the rechargeable battery, with a lower section (26) of the connecting socket (2) being embedded in the plastic material of the cover part (1) and a plurality of friction-reducing sliding elements (3), which are in the form of strips and are separated from one another over an internal circumference of the connecting socket (2), are arranged on an inside of the connecting socket (2), wherein one, a number, or all of the sliding elements (3) extends or extend at least over the lower section (26) of the connecting socket (2) in a longitudinal direction (L) of the connecting socket (2); and wherein a separation is provided between each adjacent sliding element (3), said separation creating free space which allows flexible matching of the individual sliding elements (3) during insertion of a pole shaft.

2. The cover part according to claim 1, characterized in that one, a number or all of the sliding elements (3) has or have the greatest dimension in a longitudinal direction (L) of the connecting socket (2).

3. The cover part according to claim 1, characterized in that one, a number or all of the sliding elements (3) extends or extend at least as far as one end of the connecting socket (2) which is directed at an interior of the rechargeable battery, in a longitudinal direction (L) of the connecting socket (2).

4. The cover part according to claim 1, characterized in that one, a number or all of the sliding elements (3) projects or project from the inside of the connecting socket (2), thus forming a separation between the inside of the connecting socket (2) and a pole shaft (5) in the area of the sliding elements (3).

5. The cover part according to claim 1, characterized in that one, a number or all of the sliding elements (3) runs or run to a point in a direction which faces away from an interior of the rechargeable battery.

6. The cover part according to claim 1, characterized in that one, a number or all of the sliding elements (3) rests or rest on an inner wall which is formed on the inside of the connecting socket (2).

7. The cover part according to claim 1, characterized in that one, a number or all of the sliding elements (3) is or are arranged distributed uniformly over the internal circumference of the connecting socket (2).

8. The cover part according to claim 1, characterized in that one, a number or all of the sliding elements (3) is or are manufactured integrally with the cover part (1) from the plastic material of the cover part (1).

9. The cover part according to claim 1, characterized in that the connecting socket (2) has a greater inclination of an inner wall with respect to a longitudinal axis (L) of the connecting socket (2) in the area of the sliding elements (3) than in a connecting section (21, 25) which projects out of the cover part (1) and is designed for connection of a pole terminal to the connecting socket (2).

10. The cover part according to claim 1, characterized in that the 30 sliding elements (3) are arranged to reduce friction between sleeve-like connecting socket (2) and a pole shaft (5).

11. A rechargeable battery having a housing part (4), at least one plate set (7) which is inserted into the housing part (4), a pole shaft (5) which is connected to the plate set (7) and a cover part (1) according to claim 1, with a pole shaft (5) being inserted into the connecting socket (2) in order to form a connecting pole.

* * * * *